United States Patent Office 3,435,523
Patented Apr. 1, 1969

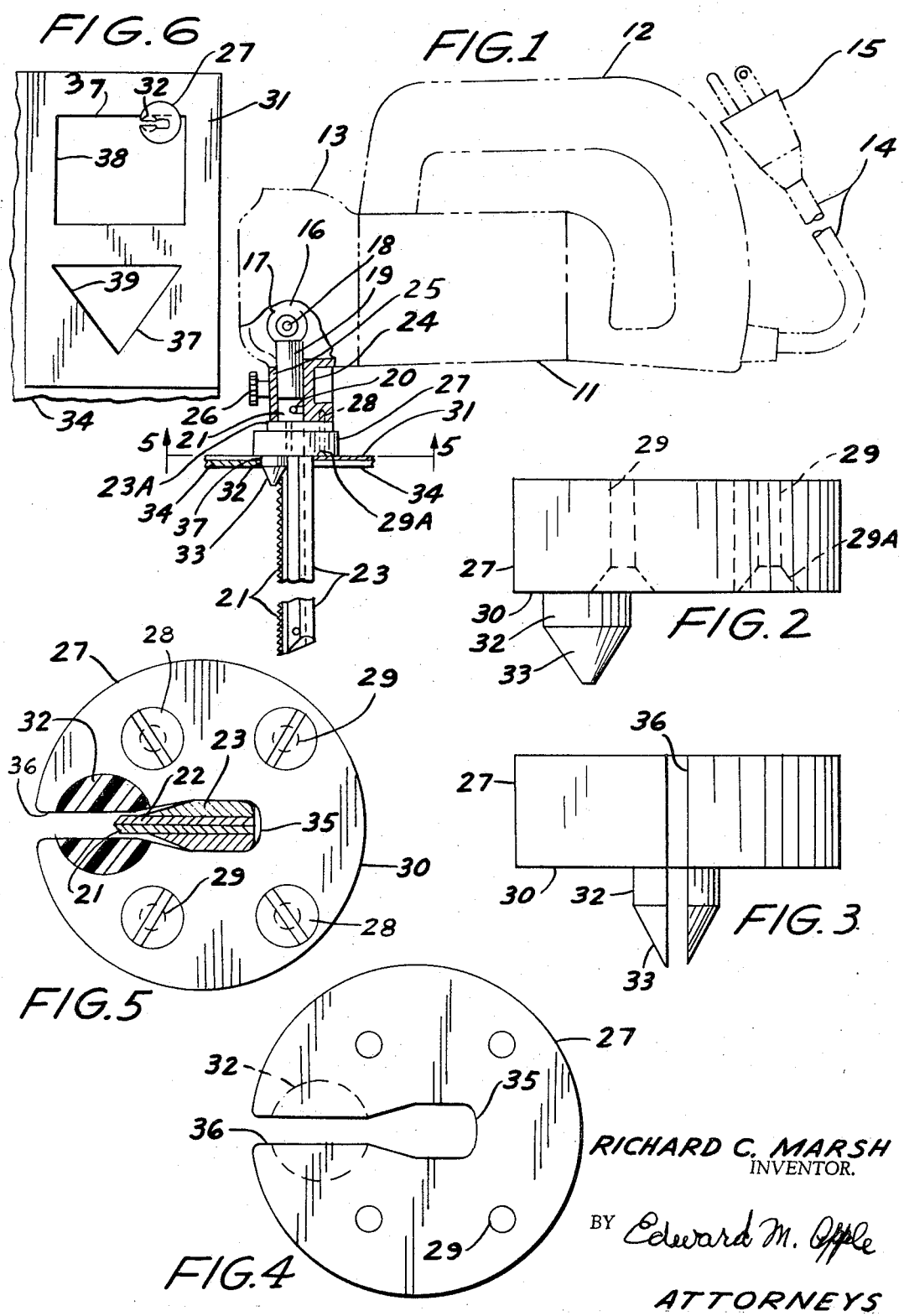

3,435,523
GUIDE AND SPACER FOR CUTTING TOOL
Richard C. Marsh, 7333 Fenkell,
Detroit, Mich. 48238
Filed Nov. 4, 1965, Ser. No. 506,299
Int. Cl. B26b 7/00
U.S. Cl. 30—272    8 Claims

ABSTRACT OF THE DISCLOSURE

This application discloses a guide and spacer for a portable, reciprocating blade, power tool, used with a metal template for making cut outs in a fibrous material such as an automobile floor mat. The invention resides in a circular body member attached to the portable power tool and having a depending, tapered extension which is received in the opening of the metal template to guide the tool around the template. The body has a central opening for receiving the saw guide and saw blades, and the body and the extension are radially slotted so the new blades may be removed from the portable tool without removing the body from the tool.

---

This invention relates to portable cutting tools and particularly to the double reciprocating tool disclosed in my copending application Ser. No. 373,031, filed June 5, 1964, now abandoned.

An object of the invention is to improve the device disclosed in my copending application, and to provide an accessory for that device which will extend the horizon of its utility.

In the employment of the device disclosed in my copending application in piercing and cutting materials while using a metal template, the problem has arisen of being able to control the manual axial and radial pressures necessary to guide the tool along the contours of the template to effect a clean cut and keep the teeth of the cutting blades from striking the template. The contact of the teeth of the double reciprocating blades with the metal template ruins the teeth, causes breakage of the blades and damage to the template. Particularly is this problem accentuated when the device is used with a template requiring cut outs in the material, for example, a cut out in an automobile floor mat for the extension therethrough of an accelerator or brake lever, cable or the like. In such instances the material is first pierced by the end of the blade sheath of the tool, preferably near the center of the proposed cut out, and then the cutting blades are moved toward the definitive wall of the template. If too much radical pressure is exerted the teeth of the blades will strike the metal template and make a cut in the template, or the blades are themselves damaged. This danger is also encountered at any sharp turn in the template.

Various means have been suggested by others to obviate the difficulty but all such innovations have left much to be desired. One guide which I tested had a flat terminal end which had a tendency to hang up on the template and defeated its very own purpose.

I have found the device embodying my invention to be particularly useful in the making of industrial patterns which are formed of wood, metal, or other material, and which are oftentimes reinforced with a layer, or layers, of fiber glass cloth, which is secured to the pattern by means of epoxy glue. Oftentimes the patterns are built up with layer upon layer of such fiber glass cloth, each layer of which is impregnated with the epoxy glue, which normally must cure for approximately twenty-four hours before it can be cut with conventional tools.

With the device embodying the invention I am able to cut the material within ten minutes after the epoxy glue has been applied and while the solvent for the glue is still liquified. When the device embodying the invention is used under such conditions the device serves as a spacer and minimizes any tendency of the epoxy solvent getting into the power train of the cutting device.

It is therefore an object of this invention to obviate all of the foregoing difficulties and to provide a guide and spacer for portable cutting tools, which is inexpensive to manufacture, easy to install and one which is foolproof in operation.

Another object of the invention is to provide a template guide for a portable cutting tool, which when once installed, may remain on the tool and does not have to be removed or dismantled in order to replace the saw blades.

Another object of the invention is to provide a spacer for a portable cutting tool which prevents glue, solvents, or other matter, with which the material being cut may be impregnated, from getting into the power train of the tool.

The foregoing and other objects and advantages of the invention will become more apparent as the description proceeds, reference being made from time to time to the accompanying drawing, forming part of the within disclosure, in which drawing:

FIG. 1 is a side elevational view, with parts broken away, and parts in section, of a device embodying the invention. The invention resides particularly in that part of the structure which is shown in solid lines.

FIG. 2 is an enlarged side elevational view of the device embodying the invention.

FIG. 3 is an enlarged front elevational view of the device shown in FIG. 2.

FIG. 4 is a top plan view of the device shown in FIG. 2.

FIG. 5 is a section taken substantially on the line 5—5 of FIG. 1.

FIG. 6 is a schematic view illustrating a metal template superimposed on a workpiece, and illustrates the manner in which the device shown in FIG. 1 is employed in cutting out a square section from the workpiece.

Referring now more particularly to the drawing it will be understood that in the embodiment herein disclosed the reference character 11 indicates the motor housing of a portable power tool having a handle 12, a housing extension 13, for enclosing the reciprocating mechanism of the power tool, which is driven in conventional manner by an electric motor housed within the housing 11.

The power tool shown in FIG. 1 is driven electrically through an extension cord 14, which is provided with a plug 15, which is used to connect the cord 14 to a suitable source of electric power.

The power tool shown in FIG. 1 is provided with a pair of pitmans 16 and 17, which are reciprocated through a suitable linkage (not shown) by the motor of the power tool. Each pitman has pivoted to it, as at 18, a slide 19, which in turn has secured to it by means of a pin 20, a saw blade 21.

A saw blade 22 (FIG. 5) is connected to a similar slide, which in turn is pivoted to the pitman 17 (FIG. 1).

The pitmans, slides, and saw blades reciprocate oppositely to one another so that a shearing action is effected between the teeth of the saw blades. The saw blades 21 and 22 reciprocate in a guide member or sheath 23 which is substantially coextensive with the blades, and the slides reciprocate in a member 24, which comprises part of the housing 13, a cover slide 25 is secured to the member 24 by means of a set screw 26.

All of the foregoing elements are more particularly described in my copending application and form no part of the invention, except as combined with the elements hereinafter described.

The instant invention resides in the provision of a portable tool guide member and spacer 27, which is secured to the housing member 24 by means of machine screws 28 (FIG. 1), which extend through suitable bores 29 formed in the member 27. The heads of the machine screws 28 are countersunk, as at 29A, so that the bottom face 30 of the member 27 remains smooth and unobstructed, so that it may rest on and be guide over the top face of a metal template 31 (FIGS. 1 and 6).

It will be understood that the machine screws 28 extend through the member 27 and a plate 23A, which comprises part of the saw guide or sheath 23, and into the member 24, and serve the double purpose of holding the member 27 and the saw guide or sheath 23 securely in position.

The invention device 27 is preferably made of a plastic material, such as "Delrin" or "nylon," and is formed with an integral, depending cylindrical element 32, the free end of which is tapered as at 33 to permit the depending element 32 to enter the openings 38 and 39 in the template 31 and guide the tool into proper cutting position and prevent the tool from getting hung up on top of the template.

The member 27 (FIGS. 4 and 5) is provided with a central opening 35, in which is received the saws 21 and 22, and the saw guide or sheath 23 (FIG. 5).

The central opening 35 communicates with a radial cut 36, which bisects the member 32, as shown in FIG. 3. With this construction the blades may be removed from the tool and replaced without the necessity of removing the body member.

It will be understood that the vertical axis of the member 32 is preferably positioned parallel with, and slightly ahead of the cutting edges of the saw blades 21 and 22, and the periphery of the member 32 is always spaced from the teeth of the blades, so that the cutting edges of the saw blades may never come in contact with the metal of the template 31, no matter how the power tool is turned in following the contours of the template 31.

The outer periphery of the extension member 32 serves as a guide for the tool by contacting the edges 37 of the cutout portions 38 and 39 of the metal template 31. The member 32 also serves as a spacer to continually space the cutting edges of the saw blades 21 and 22 from the metal of the template 31, no matter in what direction the cutting tool is turned when in use.

The vertical thickness of the body member 27 also serves as a spacer between the work piece 34 and the power train of the tool, thereby minimizing the possibility of any glue solvent or other substance with which the work piece 34 is impregnated from getting into the power train of the portable cutting tool.

It is believed that the operation of the device is obvious from the foregoing description.

Having described my invention, what I claim and desire to secure by Letters Patent is:

1. A guide and spacer in combination with a portable reciprocating blade power tool having an elongated sheath and a reciprocated cutting blade, said sheath being coextensive with said blade, said guide and spacer comprising a thick disk-like body member, means to secure the said body member to the housing of the power tool, an axial opening in said body member for receiving the said blade and sheath, and a depending cylindrical extension on said body, radially spaced from said opening, said cylindrical extension having a tapered free end.

2. The structure of claim 1, in which there is a radial cut in said body communicating with said opening and bisecting said extension.

3. The structure of claim 1, in which the vertical axis of said extension is parallel with and slightly ahead of the cutting edge of said blade.

4. The structure of claim 1, in which the tapered end of said extension serves as a guide for the entry of the extension into an opening in a template and the cylindrical portion of said extension is received against the edge of said template whereby to guide the tool around said template.

5. The structure of claim 1, in which the face of said body away from the power tool is flush except for said extension.

6. The structure of claim 1, in which the periphery of said extension is spaced from the periphery of said body.

7. The structure of claim 1, in which the said body has substantial thickness and forms a spacer between the power train of said power tool and a work piece, whereby to effectively prevent the transmission of deleterious material from the workpiece to the power train.

8. The structure of claim 1, in which the surface of said body away from said power tool is flush, except for said extension, and is received on the surface of a template and the outer periphery of said extension is received against the edge contours of said template to hold the cutting edge of said blade in spaced relation with said template at all times when being used.

References Cited

UNITED STATES PATENTS

| | | | |
|---|---|---|---|
| 373,686 | 11/1887 | Schloer | 143—167 |
| 444,851 | 1/1891 | Rice | 143—167 |
| 2,749,951 | 6/1956 | Tetzner | 143—167 |

DONALD R. SCHRAN, *Primary Examiner.*

U.S. Cl. X.R.

143—68, 167